United States Patent [19]
Jones et al.

[11] Patent Number: 5,639,514
[45] Date of Patent: Jun. 17, 1997

[54] PROCESS FOR COATING A METAL SUBSTRATE FOR PACKAGING END USE

[75] Inventors: Ian Thomas Jones, Essex; Anthony Brian Port, Leicestershire, both of United Kingdom

[73] Assignee: Courtaulds Coatings (Holdings) Limited, United Kingdom

[21] Appl. No.: 367,254

[22] PCT Filed: Jul. 6, 1993

[86] PCT No.: PCT/GB93/01418

§ 371 Date: Mar. 1, 1995

§ 102(e) Date: Mar. 1, 1995

[87] PCT Pub. No.: WO94/01224

PCT Pub. Date: Jan. 20, 1994

[30] Foreign Application Priority Data

Jul. 8, 1992 [GB] United Kingdom ............... 9214516
May 14, 1993 [GB] United Kingdom ............... 9309977

[51] Int. Cl.$^6$ .................................................. B05D 3/02
[52] U.S. Cl. .................. 427/318; 427/358; 427/388.1; 118/68; 118/410; 118/419
[58] Field of Search ........................... 427/318, 358, 427/388.1; 118/410, 68, 419

[56] References Cited

U.S. PATENT DOCUMENTS 4,899,691  2/1990  Fitzgerald, Jr. et al. ............... 118/410
4,990,364  2/1991  Bolte et al. ............... 427/386

FOREIGN PATENT DOCUMENTS

369477  5/1990  European Pat. Off. .

*Primary Examiner*—Katherine A. Bareford
*Attorney, Agent, or Firm*—Nixon & Vanderhye

[57] ABSTRACT

A process for coating a metal substrate for packaging end use by applying to a primary substrate a thermosettable composition which is free of added solvent and has a residual solvent content not exceeding 10% derived from the manufacture of any of the ingredients. The composition is applied as a thermosettable film by extrusion in melt (including plastified) form through an extrusion coating die onto a substrate. There is relative movement between the die and the substrate so that successive areas on the substrate are coated with the thermosettable composition, so as to form a film. The primary substrate is the metal substrate for packaging end use or an intermediate temporary support from which the applied coating is transferred onto the metal substrate for packaging end use. The applied coating is thermally cured after extrusion through the extrusion coating die. Compositions suitable for use in this and other coating processes are described.

37 Claims, 2 Drawing Sheets

PROCESS FOR COATING A METAL SUBSTRATE FOR PACKAGING END USE

This is a nation stage application of PCT/GB93/01418, filed Jul. 6, 1993.

This invention relates to a process for forming a cured thermoset coating on a metal substrate for packaging end uses, including packaging of liquid and dry products, especially for use in the packaging (including processing or holding) of foods and beverages. The invention also relates to thermosettable compositions for use in coating metal substrates for packaging end use.

BACKGROUND OF THE INVENTION

Currently, thermosetting protective and decorative coatings are generally applied to metal strip or sheet for packaging end uses by roller-coating of a solvent-based lacquer (which may comprise water and a co-solvent) typically comprising 30–60% by weight solids. After application of the lacquer to the metal strip or sheet, the solvent is removed by evaporation and the applied coating is cured. For cost and environmental reasons, it would be desirable to be able to reduce the usage of organic solvents in the application of thermosetting coatings, and the present invention is directed to that objective.

U.S. Patent Specification No. 4,990,364 describes solvent-free, low monomer or monomer-free polymerisable or curable compositions for use in coating various classes of substrates, including metal substrates for packaging end use. The compositions are indefinitely stable under the conditions described and are curable only by means of free-radical initiators in conjunction with heat treatment; by means of actinic light, especially ultra-violet radiation; or by electron radiation. There is no disclosure of thermally activated crosslinkable systems.

DETAILED DESCRIPTION OF THE INVENTION

The present invention provides a process for coating a metal substrate for packaging end use, which comprises applying to a primary substrate a thermosettable (that is to say, thermally crosslinkable/curable) composition suitable for forming a coating for packaging end use, wherein the thermosettable composition is substantially solvent-free, the composition is applied as a thermosettable film by extrusion in melt (including plastified) form through an extrusion coating die onto a substrate, there being relative movement between the die and the substrate so that successive areas on the substrate are coated with the thermosettable composition so as to form a film, the primary substrate being the metal substrate for packaging end use or an intermediate temporary support from which the applied coating is transferred onto the metal substrate for packaging end use, and the applied coating is thermally cured after extrusion through the extrusion coating die.

It is an important feature of the present invention that the solvent content of the applied composition is to be low as compared with the practice hitherto in applying thermosetting coatings for packaging purposes. Specifically, no solvent is added to the composition at any stage of the process and, moreover, the residual solvent content of the composition derived from the manufacture of any of the ingredients does not exceed 10% by weight, advantageously does not exceed 5% by weight, preferably does not exceed 4% or 3% by weight, and more especially does not exceed 2% by weight. In many cases, the solvent content of the composition will be sufficiently low that it will not be necessary to take any further measures to comply with legislation concerning volatile organic solvent emissions.

It is also an important feature of the process of the invention that it is possible to obtain uniform thin films on the substrate by extrusion of substantially solvent-free thermosettable compositions in molten or plastified form.

Metal substrates coated in accordance with the process of the invention may be employed for any of a wide range of packaging end uses, and a coating may be applied in accordance with the invention for interior protection of containers and the like and/or for exterior decoration. Thus, for example, the process may be used to obtain coated substrates for the packaging of aerosol preparations or paints. More especially, however, the process is used to obtain coated metal substrates which are suitable for use in the packaging (including processing or holding) of foods and beverages. For that purpose the coated substrate may be formed into a container for food or drink, or into a component for such a container, or into a closure for such a container, such as a lid or bottle top. The process may be used to apply an exterior decorative coating and/or an interior protective coating. For internal protective purposes it will be appreciated that the finished coating must be such as to provide a surface which will not contaminate foods or beverages coming into contact therewith.

The invention also provides a solvent-free, thermosettable composition for use in coating metal substrates for packaging end use. Such compositions may be applied to metal substrates by means of the process of the present invention or by other suitable coating processes, for example, by roller coating or by solid block coating techniques.

It will be appreciated that the term "thermosettable", as used herein in relation to compositions, is used in its ordinary meaning to denote that the composition is curable by the action of heat, as distinct from compositions which, for curing, require additional or alternative expedients such as the presence of free-radical initiators, photo-initiators, or the use of electron radiation. It is a feature of the present invention that the coating composition is thermosettable and comprises components which are thermally reactive but which are nevertheless manipulated in melt form prior to application to the substrate and curing. In contrast, for instance, with U.S. Pat. No. 4,990,364, compositions of the present invention do not require the presence of ethylenically unsaturated reactive groups such as, for example, acrylic and/or methacrylic groups, prior to curing, and preferred thermosettable compositions in accordance with the invention contain substantially no such reactive unsaturation.

A solvent-free thermosettable composition in accordance with the invention will generally comprise a substantially solvent-free film-forming resin and a corresponding curing agent (which may itself be another film-forming polymer). Self-crosslinkable systems, not requiring any added curing agent, are possible in principle.

The composition may, for example, comprise one of the following systems, or a blend of two or more such systems may be used:

1) Epoxy resin, or epoxy novolac resin, preferably, but not limited to, bisphenol A/epichlorohydrin-based materials exemplified by solid materials such as, for instance, Shell Epikote 1009, 1007, 1004, 1002, 1001 and 828, in combination with one or more resole phenolic resins which may be alkylated or non-alkylated as exemplified by Uravar FB190, Uravar FB120, Varcum 29-101, Varcum 29-108, Varcum 29-159, Varcum 29-183 and Varcum 94-635.

The epoxy resin may be modified with (a) one or more polyesters, which may be branched or linear, acid- and/or hydroxy-functional, as exemplified by Dynapol LH820 (a saturated, medium molecular weight, linear, hydroxy-functional polyester); Dynapol L858 (a saturated, high molecular weight, branched polyester); Dynapol L206, (a saturated, high molecular weight, linear polyester); and Uralac 2695 (a saturated, medium molecular weight, branched carboxylated polyester); or (b) one or more diacids, exemplified by succinic, adipic, sebacic, isophthalic, terephthalic and phthalic acids or (c) one or more diols exemplified by ethylene, propylene, diethylene and triethylene glycols, 1,4-butanediol, 1,6-hexanediol, and cyclohexanedimethanol.

The system may be further crosslinked with one or more essentially solvent-free aminoplast resins, exemplified by Cymel 301 (hexamethoxymethyl melamine), Cymel 1123 (Benzoguanamine formaldehyde), Cymel 1170 (Glycol uril formaldehyde) and UFR-80 (Urea formaldehyde), all from Dyno Cynamid, and/or bisphenol A epichlorohydrin-based epoxy resins, exemplified by liquid materials such as, for instance, Shell Epikote 828, Dow DER330, Ciba Araldite GY2600 and 260, and/or epoxy novolac resins exemplified by Dow DEN 431 or DEN 438.

Polyester resin, as exemplified by those described in 1)a) above, in combination with one or more resole phenolic resins as exemplified by those described in 1) above, and/or essentially solvent-free aminoplast resins, as exemplified by those described in 1) above. The system may be further crosslinked with additions of epoxy (e.g. liquid epoxy) and/or epoxy novolac resins as exemplified by those described in 1) above.

3) Epoxy resin, as exemplified by materials such as those described in 1) above, in combination with one or more organic anhydrides or anhydride oligomers as exemplified by one or more of trimellitic, succinic, phthalic, hexahydrophthalic and tetrahydrophthalic anhydrides.

4) Epoxy resin, as exemplified by materials such as those described in 1) above, in combination with high solids, typically at least 60%, acid-functional acrylic polymers, acid value typically greater than 50 mg KOH/g as exemplified by Reichold Synthemal 40-462, McWhorter Acrylamac 7555, HiTek CMD 979, HiTek RGX-87425, Paraloid AT-70, or Paraloid AT-85.

5) Hydroxy-functional polyester, as exemplified by those described in 1) above, in combination with isocyanate which may be internally or externally blocked as exemplified by uret diones, phenol blocked isocyanates, such as for instance, Desmodur AP stable (Bayer), and/or essentially solvent-free aminoplast resin as described in 1) above.

6) (a) Emulsion polymers based on crosslinkable thermosetting acrylic resins, as exemplified by Union Carbide Ucar 4510 and Rohm & Haas Primal AC1822, crosslinked with additional components such as essentially solvent-free resole phenolic resins, essentially solvent-free aminoplast resins, liquid or solid epoxy resins or epoxy-novolac resins, all as described in 1) above.

(b) Emulsion polymers based on self-crosslinking thermosetting acrylic resins, as exemplified by Rhoplex AC-604, AC-625, AC 1230 and HA-16.

7) A linear or branched polyester with acid functionality sufficient for reaction with the chosen crosslinking agent, which may be an epoxy resin, more especially an epoxy resin as described in 1) above. Typically, the polyester will have an acid value of at least 30 mg KOH/g as exemplified by EMS Grilesta V72/6 and Uralac P2695.

The system may be crosslinked with dicyandiamide, epoxy-novolac, phenolic and/or aminoplast resins as described in 1) and 2) above.

It will be understood that in principle a coating composition according to the invention may comprise one or more film-forming resins, which may be self-crosslinkable or may be used in conjunction with one or more curing agents as appropriate, depending upon the number and type of curable functional groups in the or each film-former. It is a feature of the invention, however, that it is not in general necessary to use a mixture (or alloy) of film-forming resins to achieve the desired characteristics, for example, thickness, in the applied coating after curing, and mention should therefore be made of compositions which comprise only one film-forming resin (which may be a self-crosslinkable material or may be used with one or more appropriate curing agents if required), i.e. a single such resin.

It is an important feature of the present invention that thermosettable compositions with a wide range of initial physical and chemical characteristics can be utilised. Thus, for example, compositions for use in accordance with the present invention may use polymeric materials with Tg, molecular weights and curing chemistries which would not be considered useful for powder coating compositions. More especially, certain specific forms of thermosettable compositions in accordance with the invention may usefully be characterised as follows:

(a) Compositions which in uncured condition have a Tg of below 40° C., preferably 35° C. or below, and more especially 30° C. or below, with mention also being made of compositions having a Tg of 5° C. or below, including such compositions having a Tg of below 0° C.;

(b) Compositions which in uncured condition have a Tg of above 70° C., preferably above 85° C., and more especially of 90° C. or above; and (c) Compositions which cure by condensation reactions yielding volatile by-products (for example, compositions comprising phenol-formaldehyde or melamineformaldehyde condensates, whether as the sole film-forming polymer system or as a crosslinker for other polymer systems, for example, epoxy or polyester systems).

All Tg values given in the present specification refer to such values as determined by differential scanning calorimetry (D.S.C.).

Compositions (a) to (c) above may be applied to metal substrates by any suitable process, and especially by a melt extrusion process in accordance with the present invention. It is to be understood that compositions which, in uncured condition, have Tg in the range of from 30° C. to 85° C. (preferably from 40° C. to 70° C.), and compositions which do not cure by condensation reactions yielding volatile by-products, are disclosed in accordance with the present invention for application to metal substrates by processes other than powder coating processes and, especially, for application by melt extrusion processes in accordance with the present invention.

In the case where the coating is to provide an interior protection surface in food or beverage packaging, it will be appreciated that the components of the coating composition must be recognised as food contact approvable for use in food contact surfaces of articles for packaging, processing or holding of food and beverages.

The proportion of curing agent in a coating composition for use in accordance with the invention may be in the range of from 0% by weight (for a self-crosslinking system) to 50% by weight, and will usually be in the range of from 5 or 10 to 25% by weight, based on the total weight of the composition.

The number average molecular weight of the or each film-forming polymer in the composition before curing will in general be in the range of from 300 to 250000, more usually from 300 to 25000, advantageously from 300 to 7000, 8000 or 10000, preferably not exceeding 5000, more especially from 500–5000.

Where appropriate, a coating composition for use in accordance with the invention may include a quantity of catalyst for the curing reaction. Examples of suitable catalysts include salts of strong or weak acids such as zinc stearate, (dialkyl) tin dialkanoates, for instance, dibutyltin dilaurate, blocked acid phosphates and blocked substituted benzene sulphonic acids, triphenyl-phosphine, phosphonium halides, and triethylamine.

To achieve decorative and other advantageous effects, such as corrosion inhibition or control of thermomechanical properties, inorganic pigments, typically titanium dioxide, may be dispersed in the major film-forming component, or as a predispersed paste, at up to 60% by weight of the total composition. Incorporation of other pigmentation is possible by the same techniques.

It will be appreciated that for certain packaging applications, no pigmentation will be required, and the invention accordingly also provides unpigmented systems.

The film formation properties and/or the dry film properties of the final cured film may be enhanced by the incorporation of inorganic or polymeric fillers, extenders and additives up to a content of, for example, 30% by weight of the total film composition. Such fillers, extenders and additives may contribute, for example, to the flow, lubricity, flexibility, adhesion, film formation and stability of the final composition, or to combinations of those properties. The materials may be incorporated in the composition in the same manner as described above for pigments or in appropriate cases may be incorporated by comelting.

A metal substrate for packaging end use may comprise aluminium, tinplate or steel (which may be tin-free steel-ECCS). The thickness of the substrate will be selected as appropriate for the particular packaging end use, and may be in the range from 0.05 mm to 3 mm, typically in the range from 0.05 mm to 2 mm, and advantageously in the range 0.1 mm to 0.4 mm.

The metal substrate may be subjected to appropriate pre-treatment, such as flame treatment or corona discharge, or an initial conversion coating may be applied, such as phosphate or chromate treatment (for example, the chromate treatment ALOCROM 404).

The metal substrate may be in the form of a moving strip or sheet, and may be transported continuously past the extrusion coating die or coating transfer station, as the case may be. Instead, the metal substrate may be in the form of a tube, preferably an open cylindrical tube, and the extrusion coating die may extend circumferentially around or within the tube over the whole or part of its circumference. Although the normal arrangement will be for the extrusion coating die to remain stationary and for the substrate to be transported past it, it is possible in principle for the substrate to remain stationary and for the die to be moved along it. As a further possibility, a substrate in tubular form may be rotated around a stationary extrusion coating die arranged internally within the tube or externally around the tube.

In the case in which the primary substrate is an intermediate temporary support from which the applied coating is transferred to the metal substrate for packaging purposes, the temporary substrate may comprise a siliconised paper from which the applied coating can readily be released, or may comprise another low surface energy substrate, for example, a fluoropolymer impregnated support such as, for instance Tygaflor.

In the process of the invention the coating composition is supplied to the extrusion coating die in melt (or plastified) form. Melting (or plastification) of the composition may be carried out in any suitable melt-mixing apparatus, which may be a static or dynamic mixer, for example, a Banbury mixer or a Z-blade mixer. The melt-mixed composition may be supplied to the extrusion coating die by means of a suitable pump, such as a gear pump or other positive displacement pump. An extruder may be used as a melt-mixer and a pump, or may be used only as a pump for a composition which has been melt-mixed by some other means.

In another form of process, the film-forming polymer and the curing agent are each independently metered to a mixer located immediately upstream of the extrusion coating die. Examples of mixers which may be used in such a process include high-efficiency mixers such as static or cavity-transfer mixers. Thus, for example, the film-forming polymer and the curing agent can each be fed through a separate melt hopper into a respective gear pump, or other positive displacement pump, which in turn feeds the corresponding component to a mixer located immediately upstream of the extrusion coating die. Such a process has the advantage of preventing or reducing unnecessary premature contact between co-reactive components of the composition. In industrial-scale processing, bulk low-temperature storage of components, fed from storage to a relatively small extruder to melt-mix and pump the composition through the coating die, may offer advantages (as compared with the use of large melt hoppers) in minimising losses of materials in the event of an enforced shutdown of the system.

A catalyst for the curing reaction, if used, may be supplied in admixture with one or other of the coreactive components of the composition, or may be injected directly into the composition immediately upstream of the extrusion coating die.

The thickness and quality of the coating applied to the substrate are dependent primarily on the following parameters:

1) The temperature of the substrate before application of the coating. In general, a metal substrate is heated to a temperature in the range of from 50° to 250° C., preferably from 70° to 200° C., for example, from 100° to 200° C., before application of the coating composition. Such heating will generally facilitate the production of relatively thin coatings. It is further believed that the preferred temperature of the substrate is related to the glass transition temperature (Tg) of the uncured composition, and is preferably in the range of from Tg+10° C. to Tg+200° C., more especially from Tg+25° C. to Tg+150° C. For the avoidance of doubt, the expression "Tg+10° C." means a temperature that is 10° C. above the Tg value, and similar expressions herein are to be understood accordingly.

2) The temperature of the extrusion coating die, which may in general be in the range of from 50° to 200° C., preferably from 80° to 180° C., advantageously at least 100° C., for example, from 120° to 180° C. It is further believed that the preferred temperature of the extrusion coating die is related to the glass transition temperature (Tg) of the uncured composition, and is preferably in the range of from Tg+10° C. to Tg+200° C., more especially from Tg+25° C. to Tg+150° C.

3) The temperature of the molten composition immediately prior to application to the substrate, which may in general be in the range of from 50° to 200° C., preferably from 80° to 180° C., advantageously at least 100° C., for example, from 120° to 180° C. It is further believed that the preferred temperature of the composition immediately prior to application to the substrate is related to the glass transition temperature (Tg) of the uncured composition, and is preferably in the range of from Tg+10° C. to Tg+200° C., more especially from Tg+25° C. to Tg+150° C.

It will be appreciated, as a feature of preferred forms of process according to the invention, that neither the temperature of the extrusion coating die [parameter 2) above], nor the temperature of the molten composition immediately prior to application [parameter 3) above], should differ unduly from the temperature of the substrate prior to the application of the coating [parameter 1) above]. Thus, for example, those temperature differences may be ±50° C., and more especially ±30° C. Particular mention may be made of processes in which the temperature of the extrusion coating die, and of the composition immediately before application, are each greater than the temperature of the substrate.

4) The rate of relative movement between the die and the substrate, which may be in the range of from 1 to 300 meters/minute, advantageously from 5 to 200 meters/minute, for example, from 10 to 150 meters/minute, especially at least 50 meters/minute.

5) The distance between the substrate surface and the outlet of the extrusion coating die, which may be in the range of from 2 to 150 microns, advantageously from 2 to 100 microns, preferably from 2 to 50 microns, more especially from 2 to 30 microns. Typically, the outlet of the extrusion coating die will comprise a rectangular slot bounded on each of its long sides by a flat end plate. In such an arrangement, it has been found to be advantageous to arrange the die so that the gap between the die face and the substrate is of generally wedge-shaped cross-section, with the gap narrowing progressively in the direction of motion of the substrate. The figures given above for the distance between the outlet of the extrusion coating die and the substrate are then applicable to the shortest distance between the die and the substrate.

6) The outlet gap width of the extrusion coating die, which may be in the range of from 50 or 100 to 1500 or 3000 microns, typically in the range of from 400 to 1000 microns.

7) The viscosity of the coating composition at the point of application to the substrate. In general, the viscosity at the point of application will not exceed 1000 poise, advantageously does not exceed 500 poise, preferably does not exceed 100 poise, and more especially does not exceed 50 poise (as measured at the application temperature by a cone and plate viscometer such as that supplied by Imperial Chemical Industries).

8) The rate at which the coating composition is applied to the substrate, which may, for example, be in the range of from 2 to 9000 cm$^3$ per minute for a strip width of 1 meter.

The residence time of the composition at the application temperature should be kept as low as possible, so as to minimise premature curing of the composition, and should in particular be well below the gel time of the composition at that temperature. It will be appreciated that, in considering what will be an acceptable residence time of the composition at the application temperature, it is also necessary to take into account the thermal history of the composition prior to application, i.e. the average residence time in different parts of the system maintained at different temperatures. By way of illustration, especially for compositions which in uncured condition have a relatively high Tg (say, 40° C. or above), the residence time of the material at the application temperature is advantageously less than 60 seconds, and preferably less than 30 seconds, for example, less than 20 seconds, more especially less than 10 seconds. For compositions which in uncured condition have a relatively lower Tg (for example, below 40° C.) but with cross-linking chemistries requiring curing at, say, 180°–200° C. for 10–15 minutes, the application temperature can be lower. The gel time of the compositions at such lower temperatures will typically be longer and, in such circumstances, the residence time of the composition at the application temperature may be longer. Thus, for example, the residence time at the application temperature may be up to 15 minutes, advantageously up to 10 minutes, preferably up to 5 minutes, for example, up to 200 seconds, more especially up to 100 seconds.

The outlet orifice of the extrusion coating die will in general be in the form of a slot of normally rectangular cross-section. The slot may extend continuously along the length of the die or may be interrupted at intervals by closed portions which, in use, will result in corresponding uncoated portions on the substrate. If desired for special effects, for example to produce differential film thicknesses, the supply to individual open portions of the extrusion orifice may be controlled by separate valves.

In order to distribute the molten composition along the length of the die, there may, for example, be a supply conduit at each end of the die, or the total melt flow may be distributed through a plurality of supply conduits arranged to open at different positions along the length of the die.

To assist in minimising any premature curing of the composition, the extrusion coating die should not contain any zones in which the melt flow may become stagnant.

As already indicated, the distance between the substrate and the outlet of the extrusion coating die is one of the parameters influencing the thickness and quality of the coating applied to the substrate. If the die is positioned too close to the substrate, there is a risk that the composition will flow around the side of the die and deposit at the edge. If, on the other hand, the die is too far from the substrate, there is a risk that the substrate will not be completely coated, and a "herringbone" pattern may be produced.

In one form of process according to the invention, the substrate is arranged to pass closely adjacent to the extrusion die outlet and is passing across or around a backing roller (coated, for example, with rubber) at the point of application of the extruded film. For example, when the substrate is passing around a backing roller from below during application of the coating, the site of application may be at any point around the circumference of the backing roller with which the moving substrate is in contact. Preferably, the arrangement is such that the axis of the extrusion die extends along a radius of the backing roller. More particularly, control of application of the coating, in terms of thickness and appearance of the finished film after curing, is facilitated if the backing roller is disposed horizontally and the site of application of the coating composition is in a plane perpendicular to the axis of rotation of the roller. In such a process, the coating pressure is controlled by the position of the die in relation to the substrate. In the case in which the substrate is passing over or across a backing roller at the point of application, good control of coating thickness and appearance can in general be achieved without it being necessary to pass the coated substrate through any subsequent calender rollers.

In another form of process according to the invention, there is no backing roller behind the substrate at the point of application of the coating composition. The coating pressure in such a process is controlled by the tension under which the substrate is maintained during transport past the extrusion die outlet.

In general, the use of a backing roller at the point of application facilitates the application of relatively thin coatings, and the arrangement with no backing roller may be more suitable for the application of thicker coatings.

For thermal curing of the applied composition, the curing temperature may be in the range of from 140° to 300° C., depending upon the nature of the composition, and may typically be in the range of from 170° to 270° C.

Depending upon the nature of the composition and the method of curing, the curing time may typically be in the range of from 2 seconds to 15 minutes, for example, from 2 to 40 seconds (preferably from 10 to 25 seconds) for rapid curing, from 2 to 5 minutes for medium-rate curing, or from 5 to 12 minutes for slower curing.

In the case where the coating composition is applied initially to an intermediate temporary support, curing may be effected wholly or partially whilst the coating is still on the temporary support, or may be wholly or partly deferred until after the composition has been transferred to the final substrate.

The use of an intermediate support may be advantageous in certain circumstances. In particular, it may assist in reducing wear on the extrusion coating die, and in some instances it may be easier to apply the coating composition to an intermediate support (which will in general be a relatively soft material) rather than directly onto the final metal substrate. Transfer of the coating from the intermediate support onto the final substrate may be carried out by methods analogous to those used in conventional lamination technology, for example, using hot nip rollers.

For packaging end use, the thickness of the applied coating after curing will in general be 30 microns or less, advantageously less than 25 microns, preferably less than 20 microns for example, less than 18, 16, 14, 12 or 10 microns, and is more particularly in the range of from 2 to 10 microns, for example from 4, 6 or 8 to 10 microns. Typically, the thickness of a cured coating in accordance with the invention will be in the range of from 4 to 12 microns, which will generally correspond to a film weight of from about 4 to 16 g/m$^2$.

After curing, the coated metal substrate may be treated with one or more lubricants or waxes, or may be subjected to any other appropriate post-curing treatment.

The invention also provides a container, more especially for food or drink, or a component or closure for such a container, formed from a metal substrate that has been coated by the process of the invention.

Formulation Examples

The following Examples illustrate the formulation of thermally crosslinkable compositions for use in the coating process of the invention. It will be appreciated that the following formulation information relates to the essential components of the compositions of the Examples and that, as already described hereinbefore, coating compositions according to the invention will generally also include one or more fillers, extenders and/or performance additives.

Formulation Example 1

800 g of Epikote 1004 (Bisphenol A based epoxy resin from Shell) was charged to a 2 liter flask fitted with a stirrer. The resin was heated until molten and the temperature raised to 120°–140° C. 200 g of Uravar FB190 (solid phenolic resin from DSM) was added quickly to the flask and allowed to mix in. The contents of the flask were discharged onto a water-cooled tray in order to cool the resin blend quickly. The solid resin blend was then broken up for use in an extruder. The hot-plate gel time of the mixture at 185° C. was 150 seconds, and the Tg was 40° C.

Formulation Example 2

A polyester with a theoretical Mn of 1550 containing propylene glycol (44.00 moles), trimethylol propane (8.40 moles), terephthalic acid (31.70 moles) and isophthalic acid (15.85 moles) was prepared. The resin had a hydroxyl value of 105 mgKOH/g, an acid value of 11 mgKOH/g and a Tg of 54° C.

800 g of this polyester was charged to a 2 liter flask fitted with a stirrer. The resin was heated until molten and the temperature raised to 120°–140° C. 200 g of Uravar FB190 (solid phenolic resin from DSM) was added quickly to the flask and allowed to mix in. The contents of the flask were discharged onto a water cooled tray in order to cool the resin blend quickly. The solid resin blend was then broken up for use in an extruder. The hot-plate gel time of the mixture at 185° C. was 150 seconds, and the Tg was 45° C.

Formulation Example 2.1

A polyester with a theoretical Mn of 1550 containing propylene glycol (44.0 moles), trimethylol propane (8.4 moles), isophthalic acid (24.4 moles) terephthalic acid (4.3 moles) and adipic acid (18.9 moles) was prepared. The resin had a hydroxyl value of 105 mgKOH/g, an acid value of 11 mgKOH/g and a Tg of 5° C. The resin was frozen then broken up for use in an extruder. 800 g of this polyester was charged to a 2 liter flask fitted with a stirrer. The resin was heated until molten and the temperature raised to 120°–140° C. 200 g of Uravar FB190 (solid phenolic resin from DSM) was added quickly to the flask and allowed to mix in. The contents of the flask were discharged onto a refrigerated tray in order to cool the resin blend quickly. The hot-plate gel time of the mixture at 185° C. was 150 seconds, and the Tg was −6° C. The resin blend was frozen then broken up for use in an extruder.

Formulation Example 3

Epikote 1007, a bisphenol A resin from Shell, (5400 g) was dissolved in butyl acetate (4154 g) at 95° C. in a reactor fitted with a stirrer. To the solution was added succinic anhydride (350 g) and the whole was processed at 95° C. until most of the anhydride had reacted. The solution was reduced to 50% NVC with butyl acetate.

This modified epoxy resin solution (100 parts) was dissolved in butanone (100 parts). The resulting solution was spray dried at near ambient temperatures using a laboratory spray drier. The hot-plate gel time of the mixture at 185° C. was 50 seconds, and the Tg was 58° C.

Formulation Example 4

Paraloid AT-70, a carboxy-functional acrylic resin from Rohm & Haas, was spray dried at elevated temperatures using a laboratory spray drier to produce an essentially solvent-free white powder.

800 g of Epikote 1004 (Bisphenol A based epoxy resin from Shell) was charged to a 2 liter flask fitted with a stirrer. The resin was heated until molten and the temperature raised to 120°–140° C. 200 g of the spray dried acrylic resin above was added. The resins were held at 120°–140° C. and allowed to mix in. The contents of the flask were discharged onto a water-cooled tray in order to cool the resin blend quickly. The solid resin blend (Tg: 56° C.) was then broken up for use in an extruder.

Formulation Example 4.1

Paraloid AT-70 a carboxyl functional acrylic resin from Rohm & Haas was spray dried at elevated temperatures using a laboratory spray drier to produce an essentially solvent free white powder.

500 g of Epikote 1004 (Bisphenol A based epoxy resin from Shell) was charged to a 2 liter flask fitted with a stirrer. The resin was heated until molten and the temperature raised to 120°–140° C. 500 g of the spray dried acrylic resin above was added. The resins were held at ca 120°–140° C. and allowed to mix in. The contents of the flask was discharged onto a water cooled tray in order to cool the resin blend quickly. The solid resin blend (Tg: 45° C.) was then broken up for use in an extruder.

Formulation Example 5

750 g of the polyester used in Example 2 was charged to a 2 liter flask fitted with a stirrer. The resin was heated until molten and the temperature raised to 140°–160° C. 525 g of Desmodur AP stable (solid blocked isocyanate resin from Bayer) was added quickly to the flask and allowed to mix in. The contents of the flask were discharged onto a water-cooled tray in order to cool the resin blend quickly. The solid resin blend (Tg: 45° C.) was then broken up for use in an extruder.

Formulation Example 5.1

750 g of the polyester used in Example 2.1 was charged to a 2 liter flask fitted with a stirrer. The resin was heated until molten and the temperature raised to 120°–130° C. 525 g of Desmodur AP stable (solid blocked isocyanate resin from Bayer) was added quickly to the flask and allowed to mix in. The contents of the flask was discharged onto a refrigerated tray in order to cool the resin blend quickly. The resin blend (Tg: −5° C.) was frozen then broken up for use in an extruder.

Formulation Example 6a

A polyester with a theoretical Mn of 2800 containing neopentyl glycol (0.9 moles), diethylene glycol (0.2 moles), terephthalic acid (0.9 moles), isophthalic acid (0.1 moles) and trimellitic anhydride (0.2 moles) was prepared using Fascat 2005 (stannous chloride) (0.05% by weight) as catalyst. The resin had an acid value of 78 mgKOH/g, a viscosity of 27 poise at 200° C. and a Tg of 60° C.

A dry mix was formed of Grilonit L1203.5 a Bisphenoi A based epoxy from EMS, (1285 g), the above polyester (1285 g), Epikote 3003, a Bisphenol A based epoxy resin from Shell, (175 g), and Uravar FB190 a solid phenolic resin from DSM (194 g).

The mixture was dry blended for 5 minutes until homogeneous and then fed into an extruder. The extruder was controlled at 80° C. with a feed rate of 10 kg/hr.

The extrudate was rolled on a cooling plate to produce thin sheets prior to kibbling into 0.3 cm³ lumps (Tg: 53° C.)

Formulation Example 6a.1

A polyester with a theoretical Mn of 2800 containing neopentyl glycol (4.37 moles), diethylene glycol (0.97 moles), terephthalic acid (1.09 moles), isophthalic acid (0.48 moles), adipic acid (3.27 moles) and trimellitic anhydride (0.97 moles) was prepared using Fascat 2005 (stannous chloride) (0.5% by weight) as catalyst. The resin had an acid value of 88 mgKOH/g a viscosity of 11 poise at 140° C. and a Tg of 20° C. The resin was frozen then broken up for use in an extruder.

A dry mix was formed of Grilonit L1203.5 a Bisphenol A based epoxy from EMS (1285 g), the above polyester (1285 g), Epikote 3003 a Bisphenol A based epoxy resin from Shell (175 g), and Uravar FB190 a solid phenolic resin from DSM (194 g).

The mixture was dry blended for 5 minutes until homogeneous and then fed into an extruder. The extruder was controlled at 80° C. with a feed rate of 10 kg/hr.

The extrudate was rolled on a cooling plate to produce thin sheets prior to kibbling into 0.3 m³ lumps (Tg: 1° C.).

Formulation Example 6b

A dry mix was formed of Grilonit L1203.5, a Bisphenol A based epoxy from EMS (1166 g), the polyester as in Example 6a (1373 g), Tiona 472, a titanium dioxide pigment from SCM (810 g), DEN 438, an epoxy novolac from Dow (207 g), and Epikote 3003, a Bisphenol A based epoxy resin from Shell (186 g).

The mixture was dry blended for 5 minutes until homogeneous and then fed into an extruder. The extruder was controlled at 80° C. with a feed rate of 10 kg/hr.

The extrudate was rolled on a cooling plate to produce thin sheets prior to kibbling into 0.3 cm³ lumps (Tg: 53° C.).

Formulation Example 6b.1

A Masterbatch was prepared by blending together in a coffee grinder Grilonit L1203.5 a bisphenol A based epoxy from EMS (166 g) and Araldite HY960 catalyst from Ciba Geigy (8.0 g).

A dry mix was then prepared of Grilonit L1203.5 (1000 g), Masterbatch as above (174 g), Polyester as in Example 6a (1373 g), Tiona 472 a titanium dioxide pigment from SCM (810 g), DEN 438 an epoxy novolac from Dow (207 g), and Epikote 3003 a Bisphenol A based epoxy resin from Shell (186 g).

The mixture was dry blended for 5 minutes until homogenous and then fed into an extruder. The extruder was controlled at 80° C. with a feed rate of 10 kg/hr.

The extrudate was rolled on a cooling plate to produce thin sheets prior to kibbling into 0.3 cm³ lumps (Tg: 1° C.).

One form of apparatus suitable for carrying out the process of the invention, and a Process Example carried out using the apparatus, will now be described, by way of example, with reference to FIG. 1 of the accompanying drawings which shows the apparatus partly in section and partly in diagrammatic form.

Figure 1:
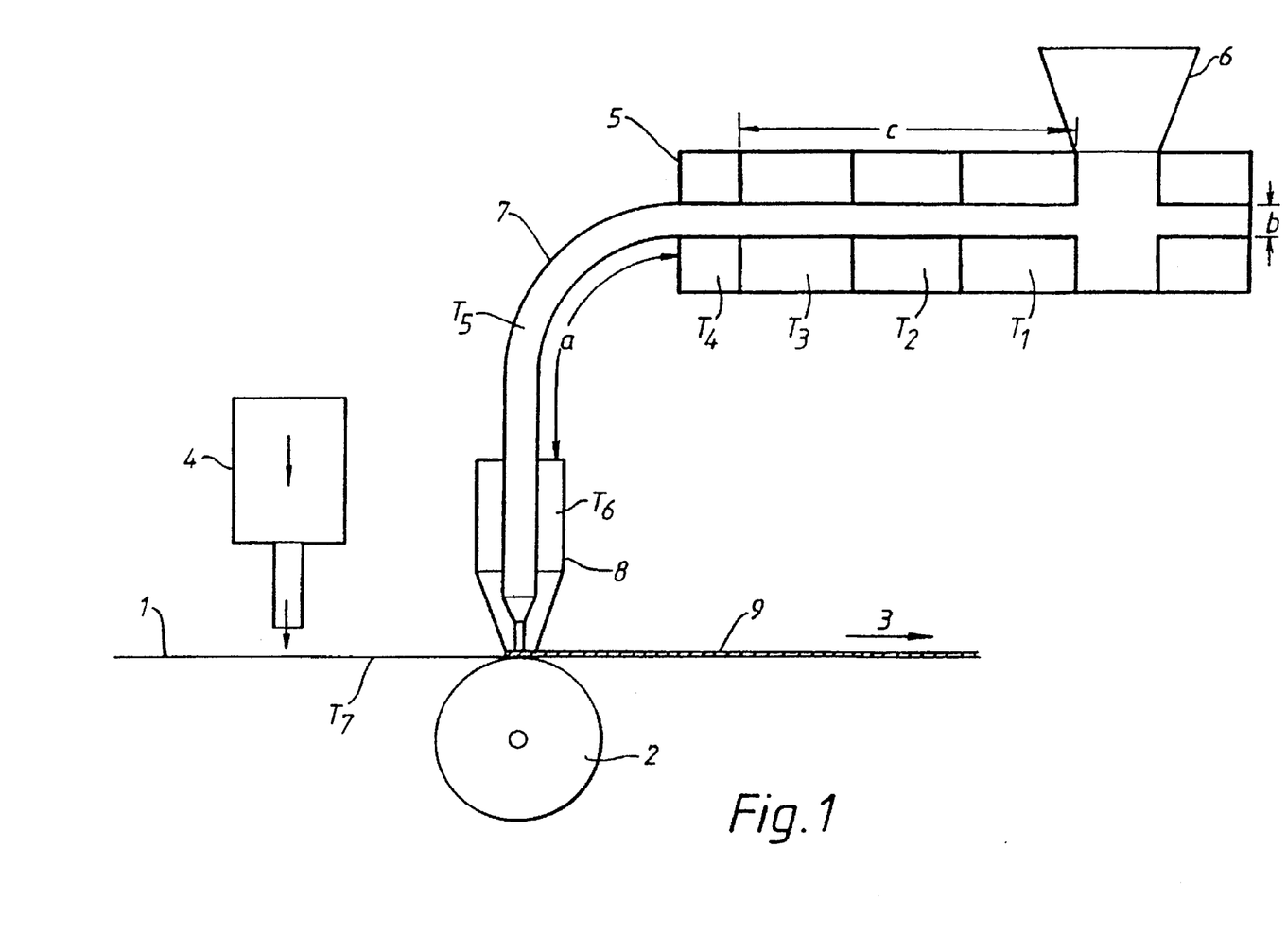
FIG. 1 is an apparatus, shown partly in section and partly in diagrammatic form, for carrying out the process of the invention.

Referring to FIG. 1, a substrate (1) to be coated is drawn across a rubber-coated backing roller (2) in the direction of the arrow (3). The substrate is pre-heated by means of a hot air stream from a heater (4). Alternative means of heating a substrate in accordance with the invention include, for example, heated rollers and induction heating.

The components of a thermosetting coating composition are pre-mixed and metered into an extruder (5) by way of a hopper (6). Successive sections along the barrel of the extruder are maintained at progressively higher temperatures ($T_1$ to $T_4$, respectively). The extruder serves to melt the composition and pump the melt along a heated conduit (7) through a heated extrusion coating die (8), from which the molten composition is applied to the substrate (1) to form a coating (9).

The conduit (7) is maintained at temperature $T_5$ and the extrusion coating die (8) is maintained at temperature $T_6$.

As examples of suitable dimensions, the internal diameter b of the extrusion barrel may be 2.5 cm; the length of the section c of the barrel may be 62.5 cm; and the length a of the conduit (7) may be 1 meter.

Optionally after intervening rolling (by rollers not shown in FIG. 1) the applied composition is cured by passing the coated substrate through a curing oven (not shown).

The substrate bearing the cured coating is fabricated, for example, into food or beverage cans.

process Example A

Substrates of tinplate or tin-free steel (thickness 0.17–0.22 mm) are coated with various coating compositions in apparatus as shown in FIG. 1. The corresponding process temperatures, substrate speed and coating thickness are shown in Table 1, all temperatures being in °C. Each applied coating is cured for 10 minutes at 200° C.

Figure 2:
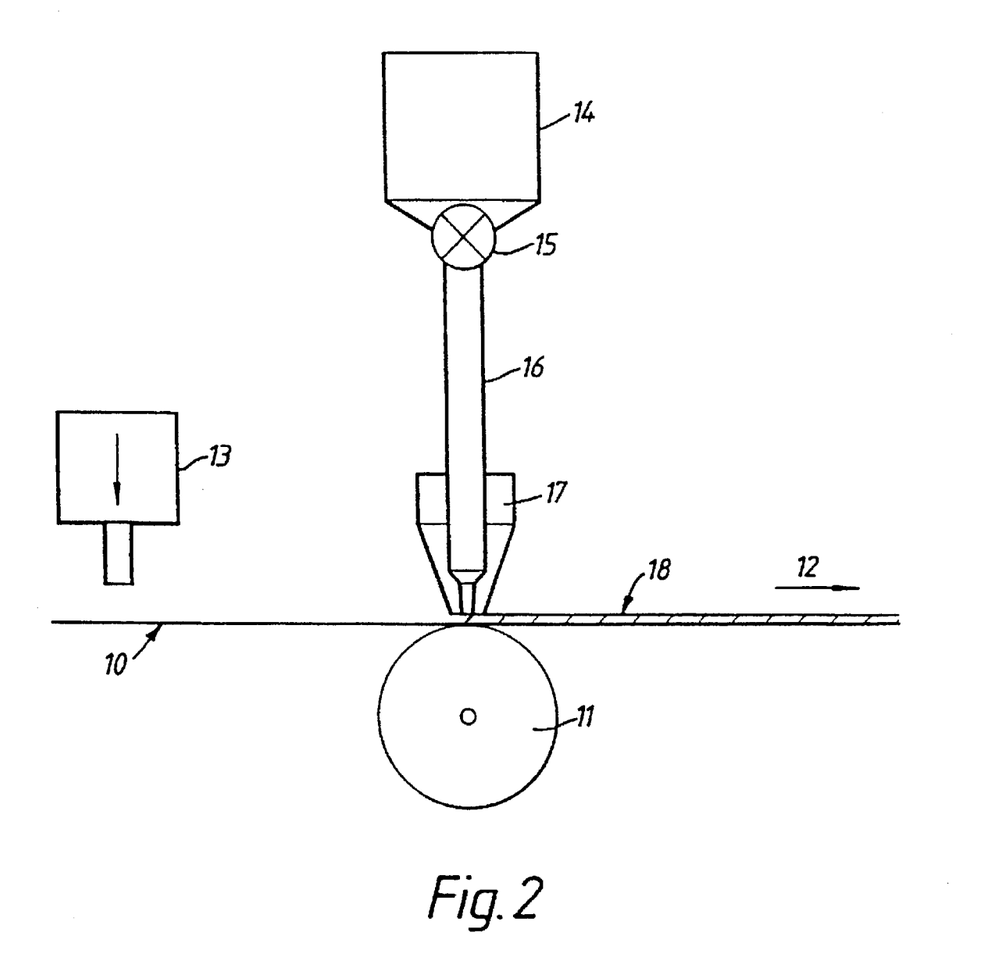
FIG. 2 is another form of apparatus, shown in diagrammatic form, suitable for carrying out the invention.

The melted composition is pumped by way of a gear pump (15) along a heated conduit (16) and through a heated extrusion coating die (17), from which the molten composition is applied to the substrate (10) to form a coating (18).

Optionally after intervening rolling (by rollers not shown in FIG. 2) the applied composition is cured by passing the coated substrate through a curing oven (not shown).

The substrate bearing the cured coating is fabricated, for example, into food or beverage cans.

process Example B

Using apparatus as shown in FIG. 2, a substrate of tinplate or tin-free steel is coated with a thermosettable composition prepared as follows:

A polyester with a theoretical Mn of 3000 containing terephthalic acid (14.7 moles), isophthalic acid (6.55 moles), adipic acid (44.1 moles), neopentyl glycol (59 moles), diethylene glycol (13.1 moles), and trimellitic anhydride (13.1 moles) was prepared. The resin had an acid value of 75 mgKOH/g and a Tg of –7° C.

5735 g of this polyester was charged to a 10 l reactor fitted with a stirrer, and heated until molten (85° C.).

1660 g of Epicote 828 and 77 g of Acronal 4F (an acrylic resin from Monsanto) was charged to a 5 l reactor and heated to 75° C. 530 g of Uravar FB 190 (solid phenolic resin from DSM) were added quickly and allowed to mix in. The resulting mixture was discharged into the 10 l reactor con-

TABLE 1

| FORMULATION EXAMPLE | | Tg | Extruder zone ± 3° C. | | | | | Die ± 5° C. | Substrate ± 10° C. | Substrate speed | Coating Thickness |
|---|---|---|---|---|---|---|---|---|---|---|---|
| CHEMISTRY | No. | °C. | $T_1$ | $T_2$ | $T_3$ | $T_4$ | $T_5$ | $T_6$ | $T_7$ | m/min | Microns |
| Epoxy/Phenolic | 1 | 40 | 30 | 50 | 95 | 95 | 100 | 120 | 85 | 7 | 30 |
| Polyester/Phenolic | 2 | 45 | 30 | 50 | 95 | 95 | 100 | 160 | 150 | 3 | <15 |
| Polyester/Phenolic | 2.1 | –6 | 10 | 25 | 50 | 50 | 50 | 70 | 70 | 7 | 10–30 |
| Epoxy/Anhydride | 3 | 58 | 30 | 50 | 95 | 95 | 100 | 130 | 150 | 3 | <15 |
| Epoxy/Acrylate | 4 | 56 | 30 | 50 | 95 | 95 | 100 | 120 | 150 | 3 | <15 |
| Epoxy/Acrylate | 4.1 | 45 | 30 | 50 | 85 | 85 | 90 | 100 | 100 | 3 | <15 |
| Polyester/Isocyanate | 5 | 45 | 30 | 50 | 95 | 95 | 100 | 160 | 150 | 3 | <15 |
| Polyester/Isocyanate | 5.1 | –5 | 10 | 25 | 50 | 50 | 50 | 70 | 70 | 7 | 10–30 |
| Epoxy/Polyester | 6a | 53 | 30 | 100 | 100 | 100 | 100 | 170 | 150 | 3 | 10–20 |
| Epoxy/Polyester | 6a.1 | 1 | 10 | 25 | 50 | 50 | 50 | 70 | 70 | 7 | 10–30 |
| Epoxy/Polyester (Pigmented) | 6b | 53 | 30 | 100 | 100 | 100 | 100 | 170 | 150 | 3 | 10–30 |
| Epoxy/Polyester (Pigmented) | 6b.1 | 1 | 10 | 25 | 50 | 50 | 50 | 70 | 70 | 7 | 10–30 |

As an illustration of the internal protection performance of the coatings applied in accordance with the foregoing Process Examples, a food can end is stamped out of each coated substrate and is subjected to standard adhesion, flexibility, porosity and accelerated pack tests. The performance is comparable to that of a commercial food can end roller-coated with conventional solvent-based material.

Another form of apparatus suitable for carrying out the process of the invention, and a process carried out using the apparatus, will now be described, by way of example, with reference to FIG. 2 of the accompanying drawings, which shows the apparatus in diagrammatic form.

Referring to FIG. 2, a substrate (10) to be coated is drawn across a rubber-coated backing roller (11) in the direction of the arrow (12). The substrate is pre-heated by means of a hot air stream from a heater (13).

The components of a thermosettable coating composition are pre-mixed and fed into a tank (14) in which the composition is melted.

taining the above polyester resin. After stirring, the contents of the reactor were discharged onto a water-cooled tray in order to cool the resin blend quickly. The hot-plate gel time of the blend at 185° C. was 65 seconds. The solid blend was broken up and stored in a refrigerated container.

The temperature conditions are as follows in Process Example B:

|  | °C. |
|---|---|
| Substrate (±10° C.) | 85 |
| Melt-tank (14) | 90 |
| Heated conduit (16) | 73 |
| Extrusion die (17) | 92 |

Food can ends are stamped out of the coated substrate after curing and subjected to standard performance tests.

In order to provide a basis for comparison with Process Example B, a commercially-available solvent-based internal food can lacquer is applied to an identical substrate by roller-coating and, after curing, food can ends are stamped out of the coated substrate and subjected to the same standard performance tests.

The results of the performance tests are summarised in Table 2 below.

TABLE 2

|  |  | Comparison | Invention |
| --- | --- | --- | --- |
| Non-volatile content |  | 35% solids | 100% solids |
| Wedge bend flexibility |  | 85% | 100% |
| Cure (MEK) rubs (No. of rubs to remove coating) |  | 34 rubs | 42 rubs |
| Adhesion (adhesive tape, 30 min @ 80° C.) |  | no loss | no loss |
| Water sensitivity (30 min @ 80° C.) |  | none | none |
| Film wt range |  | 5–6 g/m$^2$ | 3–6 g/m$^2$ |
| Appearance |  | smooth/glossy | smooth/glossy |
| Pack resistance (Scale: 0 = good 4 = poor) |  |  |  |
| (a) Tomato puree | Stain | 2 | 3 |
|  | Attack | 1 | 3 |
| (b) Cysteine 1½% | Stain | 0 | 0 |
|  | Attack | 0 | 0 |
| (c) Tap water | Blush | 0 | 0 |
|  | Attack | 0 | 0 |
| (d) Acetic acid ½% | Blush | 0 | 0 |
|  | Attack | 0 | 0 |

The results show that the performance of the coating applied in accordance with the invention is generally similar to that of the commercially-available solvent-based material used as the basis for comparison.

Further process Examples

In another form of process according to the invention, suitable especially for use with compositions of relatively low Tg, a composition as described in Process Example B was charged into a pressure vessel having an upper inlet for compressed air and a lower discharge outlet connected by a tube to an extrusion coating die. In operation, the pressure vessel and the tube were heated to 50° C. and the vessel was pressurised to 80 psi thereby causing the coating composition to flow into and through the die and onto the substrate.

In a specific form of this process, the coating composition was applied to a substrate comprising a polyethylene terephthalate (PET) film pre-coated with a silicone release agent. The resulting coating (thickness 20 microns) was then transferred onto a pre-heated metal substrate by compression of the coated PET film and the metal substrate between nip rollers.

We claim:

1. A process for coating a metal substrate for packaging end use, which comprises applying to a primary substrate a thermosettable composition suitable for forming a coating for packaging end use, wherein the thermosettable composition is free of added solvent and has a residual solvent content not exceeding 10% by weight derived from a manufacture of any of ingredients of the thermosettable composition, the composition is applied as a thermosettable film by extrusion in melt form including in plastified form, through an extrusion coating die onto a substrate, there being relative movement between the die and the substrate so that successive areas on the substrate are coated with the thermosettable composition, so as to form a film, the primary substrate being the metal substrate for packaging end use or an intermediate temporary support from which the applied coating is transferred onto the metal substrate for packaging end use, and the applied coating is thermally cured after extrusion through the extrusion coating die to provide a coating having a thickness of 30 microns or less.

2. A process as claimed in claim 1, wherein the thickness of the applied coating after curing is less than 25 microns.

3. A process as claimed in claim 1, wherein the thickness of the applied coating after curing is less than 20 microns.

4. A process as claimed in claim 1, wherein the thickness of the applied coating after curing is less than 18 microns.

5. A process as claimed in claim 1, wherein the thickness of the applied coating after curing is less than 16 microns.

6. A process as claimed in claim 1, wherein the thickness of the applied coating after curing is less than 14 microns.

7. A process as claimed in claim 1, wherein the thickness of the applied coating after curing is less than 12 microns.

8. A process as claimed in claim 1, wherein the thickness of the applied coating after curing is less than 10 microns.

9. A process as claimed in claim 1, wherein the thickness of the applied coating after curing is at least 2 microns.

10. A process as claimed in claim 1, wherein the thickness of the applied coating after curing is at least 4 microns.

11. A process as claimed in claim 1, wherein the thickness of the applied coating after curing is at least 6 microns.

12. A process as claimed in claim 1, wherein the thickness of the applied coating after curing is at least 8 microns.

13. A process as claimed in claim 1 wherein the thickness of the substrate is in the range of from 0.05 to 3 min.

14. A process as claimed in claim 1 wherein the residual solvent content of the coating composition derived from the manufacture of any of the ingredients does not exceed 5% by weight.

15. A process as claimed in claim 1, wherein the residual solvent content of the coating composition derived from the manufacture of any of the ingredients does not exceed 4% by weight.

16. A process as claimed in claim 1, wherein the residual solvent content of the coating composition derived from the manufacture of any of the ingredients does not exceed 3% by weight.

17. A process as claimed in claim 1, wherein the residual solvent content of the coating composition derived from the manufacture of any of the ingredients does not exceed 2% by weight.

18. A process as claimed in claim 1, wherein a metal substrate is heated to a temperature in the range of from 50° to 250° C. before application of the coating composition.

19. A process as claimed in claim 1, wherein the extrusion coating die is at a temperature in the range of from 50° to 200° C.

20. A process as claimed in claim 1 wherein the extrusion coating die is at a temperature in the range of from Tg+10° C. to Tg+200° C., where Tg is the glass transition temperature of the uncured composition.

21. A process as claimed in claim 1 wherein, immediately prior to application to the substrate, the molten composition is at a temperature in the range of from 50° to 200° C.

22. A process as claimed in claim 1 wherein, immediately prior to application to the substrate, the molten composition is at a temperature in the range of from Tg+10° C. to Tg+200° C., where Tg is the glass transition temperature of the uncured composition.

23. A process as claimed in claim 1, wherein there is relative movement between the die and the substrate at a rate in the range of from 1 to 300 meters/minute.

24. A process as claimed in claim 1, wherein there is a distance in the range of from 2 to 150 microns between the substrate surface and the extrusion coating die.

25. A process as claimed in claim 1, wherein the extrusion coating die has an outlet gap width in the range of from 50 to 3000 microns.

26. A process as claimed in claim 1, wherein upon application the coating composition has a viscosity not exceeding 1000 poise.

27. A process as claimed in claim 1, wherein the process comprises maintaining the composition at application temperature for a residence time which does not exceed 15 minutes.

28. A process as claimed in claim 1, wherein the substrate passes across or around a backing roller upon application of the extruded film.

29. A process as claimed in claim 1, wherein in uncured condition the thermosettable composition has a Tg of below 40° C., where Tg is the glass transition temperature of the uncured composition.

30. A process as claimed in claim 1, wherein in uncured condition the thermosettable composition has a Tg of above 70° C., where Tg is the glass transition temperature of the uncured composition.

31. A process as claimed in claim 1, wherein the thermosettable composition cures by at least one condensation reaction fielding volatile by-products.

32. A process as claimed in claim 1, wherein the thermosettable composition comprises a thermosettable system selected from the group consisting of:

(i) an epoxy resin, or an epoxy novolac resin, in combination with one or more resole phenolic resins;

(ii) a polyester resin in combination with one or more phenolic resins and/or aminoplast resins;

(iii) an epoxy resin in combination with one or more organic anhydrides or anhydride oligomers;

(iv) an epoxy resin in combination with one or more high solids, acid-functional acrylic polymers;

(v) a hydroxy-functional polyester in combination with a blocked isocyanate and/or an aminoplast resin;

(vi) an emulsion polymer based on a crosslinkable, thermosetting acrylic resin in combination with one or more curing agents;

(vii) an emulsion polymer based on a self-crosslinking thermosetting acrylic resin; and (viii) an acid-functional, linear or branched polyester in combination with dicyandiamide or with an epoxy or epoxy-novolac resin, a phenolic resin or an aminoplast resin.

33. A process as claimed in claim 32, wherein the thermosettable system is an emulsion polymer (vi) and the curing agent is selected from the group consisting of resole phenolic resins, aminoplast resins, liquid epoxy resins, solid epoxy resins and epoxy novolac resins.

34. A process as claimed in claim 1, wherein the thermosettable composition is unpigmented.

35. A process as claimed in claim 1, wherein the thermosettable composition comprises a single film-forming resin and one or more corresponding curing agents as appropriate.

36. A process as claimed in claim 1, wherein the thermosettable composition comprises a single, self-crosslinkable film-forming resin.

37. A process as claimed in claim 1, wherein the thermosettable composition contains substantially no ethylenically unsaturated reactive groups.

* * * * *